United States Patent [19]

Shinmyo

[11] Patent Number: 4,653,049
[45] Date of Patent: Mar. 24, 1987

[54] MULTIDIRECTION MULTIPLEX COMMUNICATION SYSTEMS

[75] Inventor: Saburo Shinmyo, Tokyo, Japan

[73] Assignee: NEC Corporation, Japan

[21] Appl. No.: 753,021

[22] Filed: Jul. 8, 1985

[30] Foreign Application Priority Data

Jul. 12, 1984 [JP] Japan .............................. 59-144711

[51] Int. Cl.⁴ .............................................. H04J 3/06
[52] U.S. Cl. ....................................... 370/95; 370/103
[58] Field of Search ......................... 370/95, 103, 104; 375/107

[56] References Cited

U.S. PATENT DOCUMENTS

| | | | |
|---|---|---|---|
| 3,566,267 | 2/1971 | Golding | 370/104 |
| 4,472,802 | 9/1984 | Pin et al. | 370/104 |
| 4,513,416 | 4/1985 | Fujiwara | 370/104 |

Primary Examiner—Douglas W. Olms
Attorney, Agent, or Firm—Laff, Whitesel, Conte & Saret

[57] ABSTRACT

In a multidirection multiplex communication system of the demand assign type including a central station and a plurality of subscriber stations cooperating therewith, a maintenance poling signal assigned to a maintenance time slot of a frame is sent from the central station to a subscriber station not requested to send an information signal, the subscriber station inserts a maintenance burst signal in a time slot of a frame corresponding to the maintenance poling signal and sends back the maintenance burst signal. The central station extracts the timing signal transmitted from the subscriber station out or the maintenance burst signal and compares the extracted timing signal with the reference timing signal in the central station to form a time difference signal. After inserting the time difference signal in the maintenance frame the central station sends back the time difference signal to the subscriber station. Based on the time difference signal, the subscriber station controls the transmission timing to be commensurate with the reference timing of the central station.

5 Claims, 9 Drawing Figures

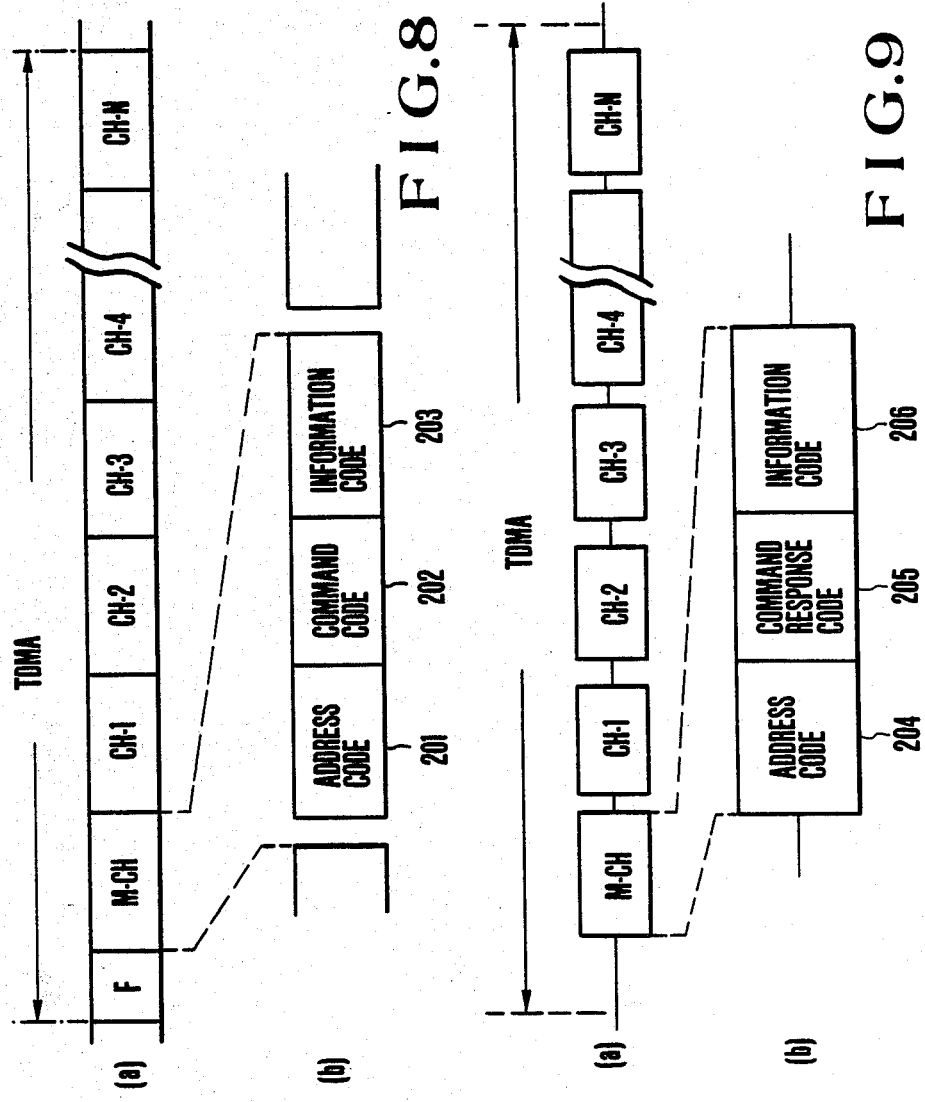

MULTIDIRECTION MULTIPLEX COMMUNICATION SYSTEMS

BACKGROUND OF THE INVENTION

This invention relates to a multidirection multiplex communication system, and more particularly to a system of improving the transmission efficiency of a multidirection multiplex communication system utilizing a demand assignment protocol.

The multidirection multiplex communication system is constructed to perform efficient communications between a central station and many subscriber stations scattered geometrically. Such system is desired to have a simple configuration and a high transmission efficiency for transmitting comparatively small information capacities.

In this system, the central station transmits information to the subscriber stations in the form of a time division multiplex (TDM) mode, and each subscriber station demultiplexes the received signal to an information addressed thereto. Each subscriber station, on the contrary, transmits information to the central station in the form of a burst signal during an assigned time duration for the subscriber station. Such burst signal is termed as a time division multiple access (TDMA) burst signal.

In this system, the central station provides the reference on the TDM/TDMA frame for all subscriber stations, and each subscriber station transmits the burst signal in accordance with the TDM/TDMA frame regenerated from the received signal sent from the central station.

In case of a pre-assigned mode, in which the position and duration of the burst signal of each subscriber station is pre-determined, transmission path correspnding to each burst is always established between the central node and the subscriber station. Therefore the central station can always detect time deviation of each burst from where it should be. By sending the detected time deviation to respective corresponding subscriber station, the transmission timing at the subscriber station can be controlled so that the received signal at the central station is regenerated at the optimum sampling position. Consequently, it is not necessary to recover the clock signals from the burst signals sent from respective subscriber stations to regenerate the data in a demodulation system at the central station. Accordingly, it is not necessary to add so-called preamble words for clock recovery to the tops of the burst signals sent to the central station from respective subscriber stations. It is also possible to eliminate preamble words for carrier recovery in PSK (Phase-shift-keying) system by adopting differencially coherent detects scheme. Thus it is possible to form a multidirectional multiplex communication system with high transmission efficiency in case of pre-assigned system.

In view of the efficient utilization of the frequency band, the pre-assigned system has a defect that the time slots assined for respective subscriber stations are always occupied ever when the subscriber stations do not need to transmit signals whereby other subscriber stations cannot utilize their time slots.

Improving this inefficiency of the pre-assigned system, a demand assigned system assignes time slots for respective subscribers only when they need to transmit signals. In this case, there exist silent subscriber stations in the system which transmit no burst to the central station. Thus, different from the pre-assigned system, it is impossible to control the transmit timings of these silent subscriber stations in the demand assigned system. Accordingly it is necessary to add preamble words for timing recovery to the heads of the burst signals sent from the subscriber station.

Thus, in the prior art multidirection multiplex communication system, with regard to the improvement of the transmission efficiency between the central and subscriber stations, the advantages of the pre-assigned and the demand assigned system contract with each other.

SUMMARY OF THE INVENTION

Accordingly, it is an object of this invention to provide a novel multidirection multiplex communication system capable of enjoying the advantages of improving the transmission efficiency of both of the preassign system and the demand assign system by constructing the communication system with the demand assign system.

According to this invention there is provided a multidirection multiplex communication system of the demand assign type including a central station and a plurality of subscriber stations cooperating therewith wherein only when one of the subscriber stations is requesting to transmit an information signal, a predetermined transmission time slot is assigned to the subscriber station, characterized in that the central station comprises means for generating a maintenance poling signal requesting a subscriber station not requesting to transmit the information signal for sending a predetermined maintenance burst signal, means for multiplexing the maintenance poling signal into a main signal constituted by a predetermined frame and for transmitting the main signal, means for extracting a transmission timing signal out of the maintenance burst signal sent as responce to the maintenance poling signal to the central station from the subscriber station not requesting transmission the information signal, means comparing the transmission timing signal with a predetermined timing signal in the central station for detecting a time shift of the transmission timing signal of the subscriber station to output the detected time shift as a time difference signal, means for multiplexing the time difference signal into a main signal constituted by a predetermined frame to send the main signal to the subscriber station, and that each subscriber station comprises means responsive to the maintenance poling signal sent from the central station for generating a maintenance burst signal under the control of a predetermined transmission timing signal and for sending back the maintenance burst signal to the central station, means for separating a time difference signal between the transmission timing signal sent from the central station and the reference timing signal in the central station from the main signal, and means responsive to the time difference signal for controlling the phase of the timing signal in the subscriber station to maintain the transmission timing signal in the subscriber station in a synchronous state commensurate with the reference timing signal in the central station.

BRIEF DESCRIPTION OF THE DRAWINGS

In the accompanying drawings:

FIGS. 8a and 8b show one example of a TDMA frame sent from the central station to the subscriber station; and FIGS. 9a and 9b show one example of a TDMA frame sent from the subscriber station to the central station.

DESCRIPTION OF THE PREFERRED EMBODIMENT

Figure 1:
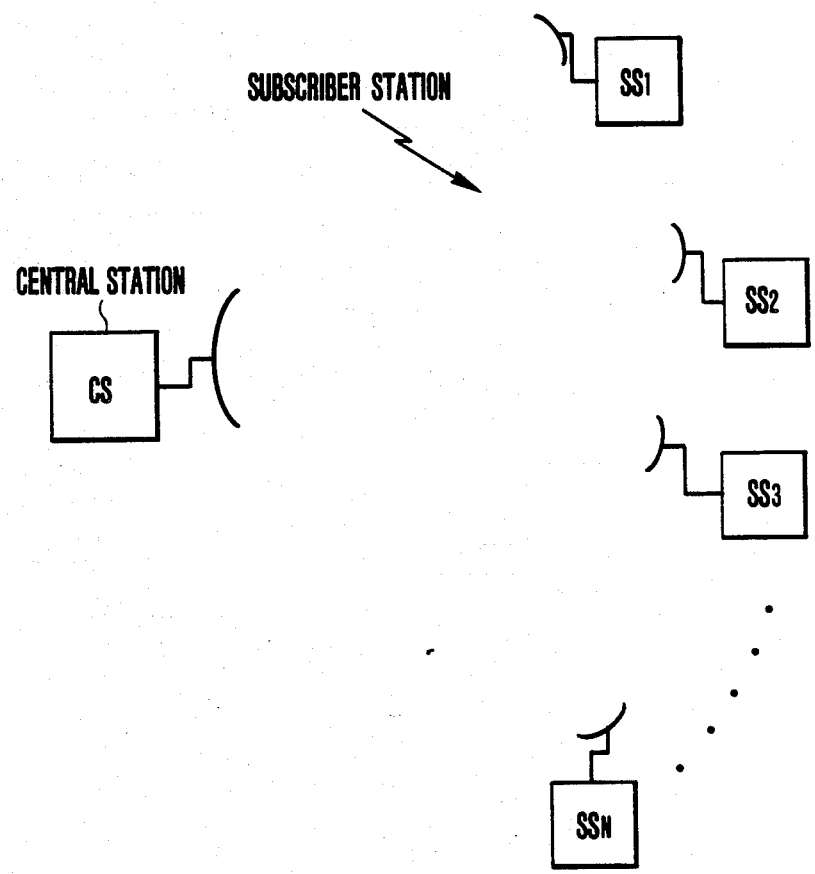
FIG. 1 is a block diagram showing the entire construction of the multidirection multiplex communication system embodying the invention.

FIG. 1 illustrates a general arrangement of a radio communication system embodying the invention in which communication is made between a central station CS and a plurality of subscriber stations $SS_1$, $SS_2$ ... $SS_n$. The central station CS is constructed to effect time division transmission of signals to the plurality of subscriber stations $SS_1$ ... $SS_n$ with a single radio unit in the same frequency range. The subscriber stations are geographically distributed and utilize a common radio frequency for transmitting informations to the central station. Each subscriber station transmits a burst signal only in a time slot assigned thereto.

Figure 2:
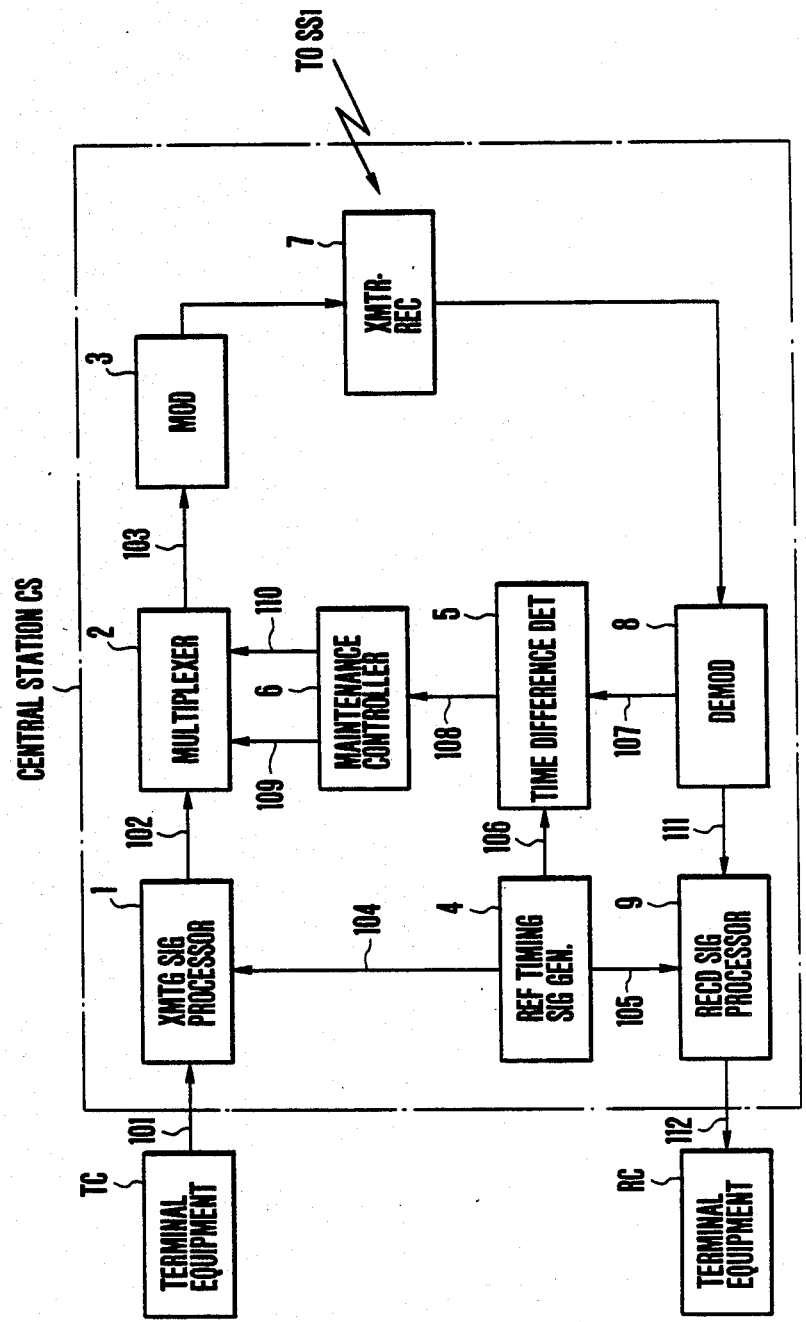
FIG. 2 is a block diagram showing the construction of one embodiment of the central station according to this inventon.
Figure 3:
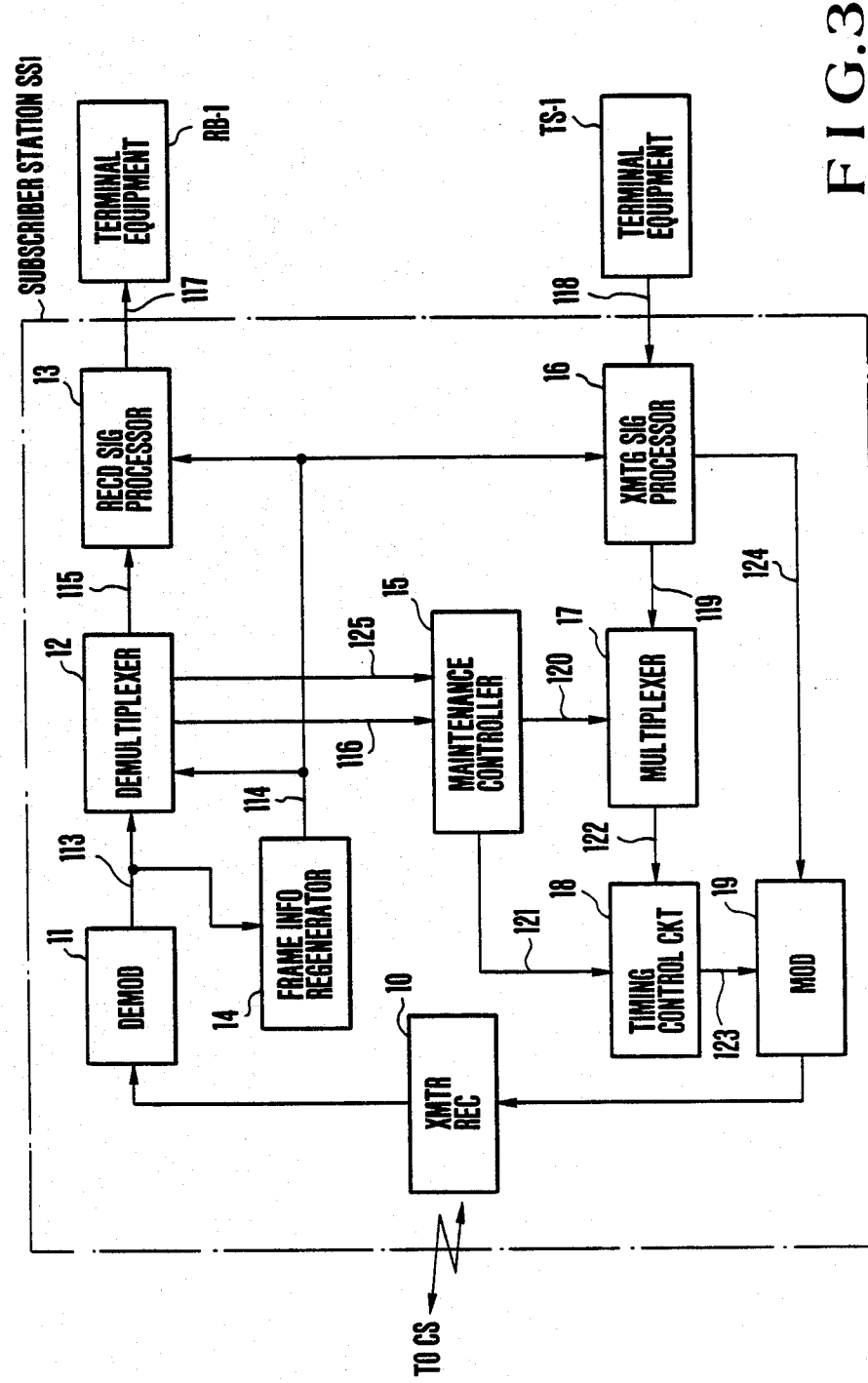
FIG. 3 is a block diagram showing the construction of one embodiment of a subscriber station according to this invention.

FIGS. 2 and 3 show block diagram of the central station and the subscriber station of one embodiment of the multidirection multiplex communication system according to this invention in which reference numbers added to connection line between blocks represent signals passing through the connection lines.

As shown in FIG. 2, the central station CS comprises a main signal transmission and a main signal receiving subsystems. The main signal transmission subsystem includes a transmission signal processor 1 connected to a transmission terminal equipment TC, a multiplexer 2, a modulator 3 and a transmitter of a transmitting-receiving unit 7. The main signal receiving subsystem includes a receiver of a transmitting-receiving unit 7, a demodulator 8, and a received signal processor 9 the output thereof being sent to a receiving terminal equipment RC.

Reference timing signals 104 and 105 are respectively supplied to the transmission signal processor 1 and the received signal processor 9 from a reference timing signal generator 4. A reference timing signal 106 from the reference timing signal generator 4, and a regenerated clock signal 107 extracted and reproduced from the regenerated signal by the demodulator 8 are supplied to a time difference detector 5 which detects the difference between the signals 106 and 107 for supplying a time difference signal 108 to a maintenance controller 6. The maintenance controller 6 outputs a maintenance poling signal when a signal is sent to a subscriber station not requesting to transmit. Further, the maintenance controller 6 outputs a time difference signal 110 when supplied with the time difference signal 108. The maintenance poling signal or the time difference signal 110 are multiplexed into the main signal 102 in the multiplexer 2.

The construction of the subscriber station is shown in FIG. 3 which shows the subscriber station $SS_1$ as a typical one. The main signal receiving subsystem of the subscriber station $SS_1$ is constituted by the receiver of a transmitting-receiving unit 10, a demodulator 11, a demultiplexer 12, and the received signal processor 13, the output thereof being sent to a receiving terminal equipment RS-1.

The main signal transmission subsystem comprises a transmission signal processor 16 connected to a terminal equipment TS-1, a multiplexer 17, a timing controller 18 and a modulator 19.

A demodulated signal 113 outputted by the demodulator 11 is supplied to a frame information regenerator 14 which in response to the demodulated signal 113 regenerates a frame synchronization signal 114 which is supplied to the demultiplexer 12, received signal processor 13 and the transmission signal processor 16. Furthermore the demultiplexer 12 sends a maintenance poling signal 116 or a time difference signal 123 to the maintenance controller 15. When supplied with the maintenance poling signal 116, the maintenance controller 15 sends a maintenance burst signal 120 to the multiplexer 17. On the other hand, when supplied with the time difference signal 123, the multiplexer 17 sends a timing control signal 121 to the timing controller 18 which sends a timing difference signal 125 to the modulator 19.

Figure 4:
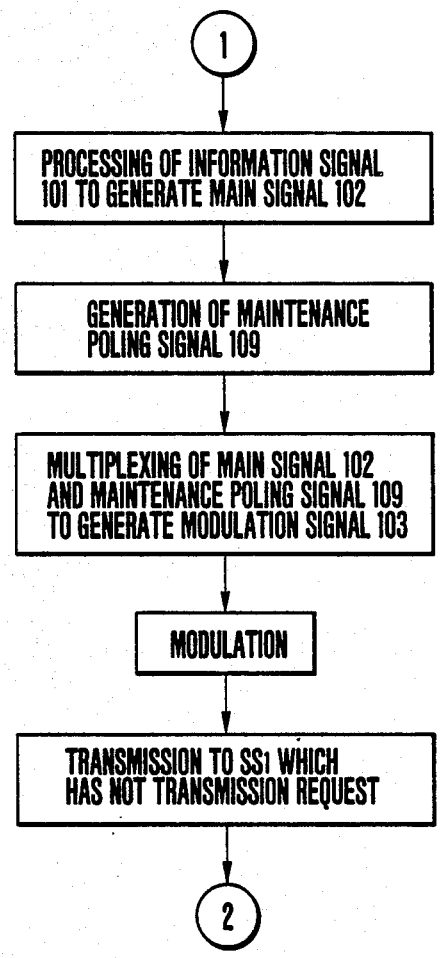
FIGS. 4-7 are flow charts for explaining the operation of the multidirection multiplex communication system of this invention.
Figure 5:
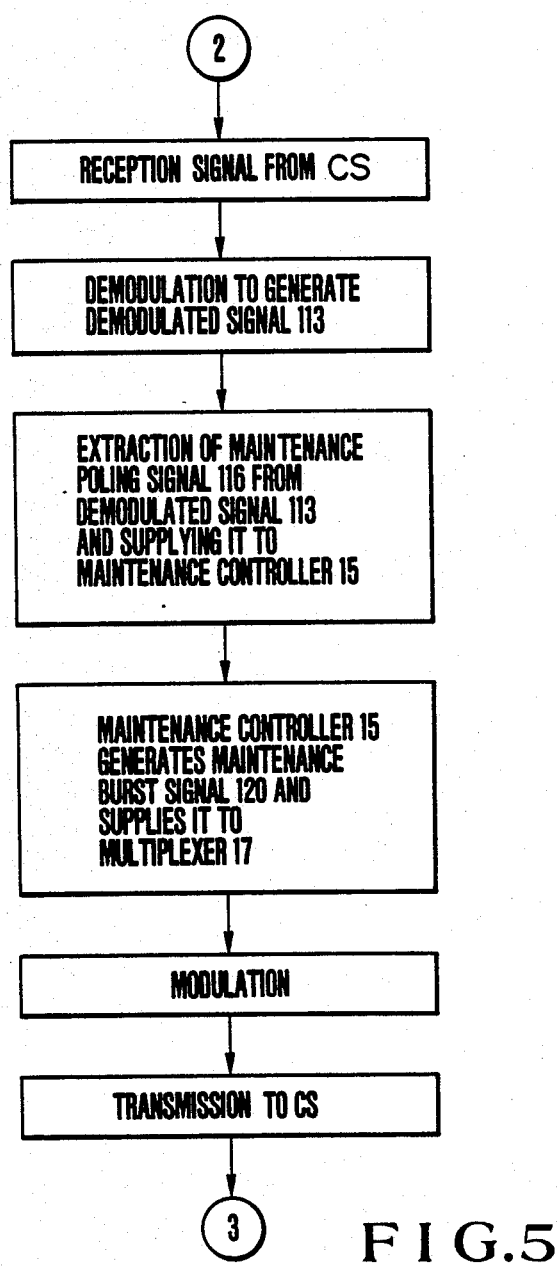
Figure 6:
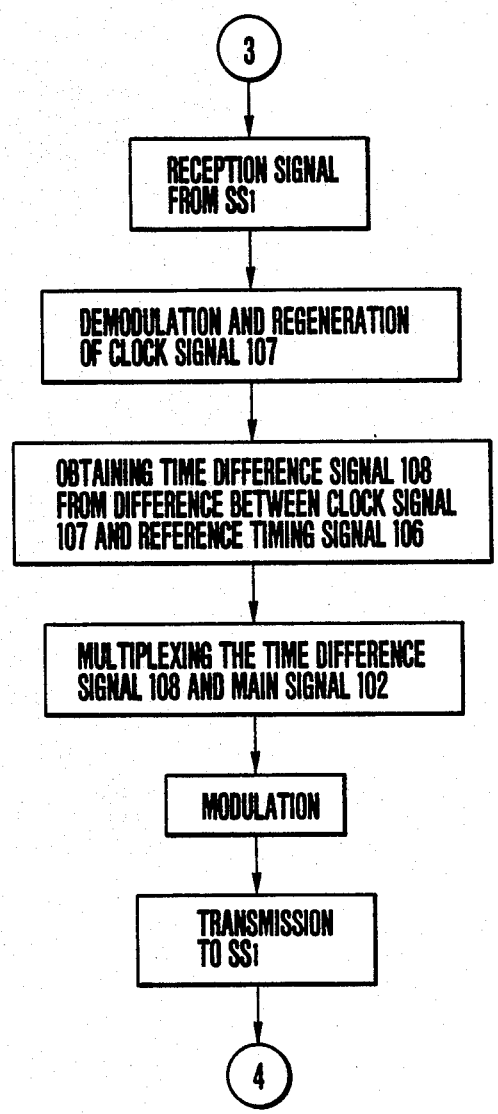
Figure 7:
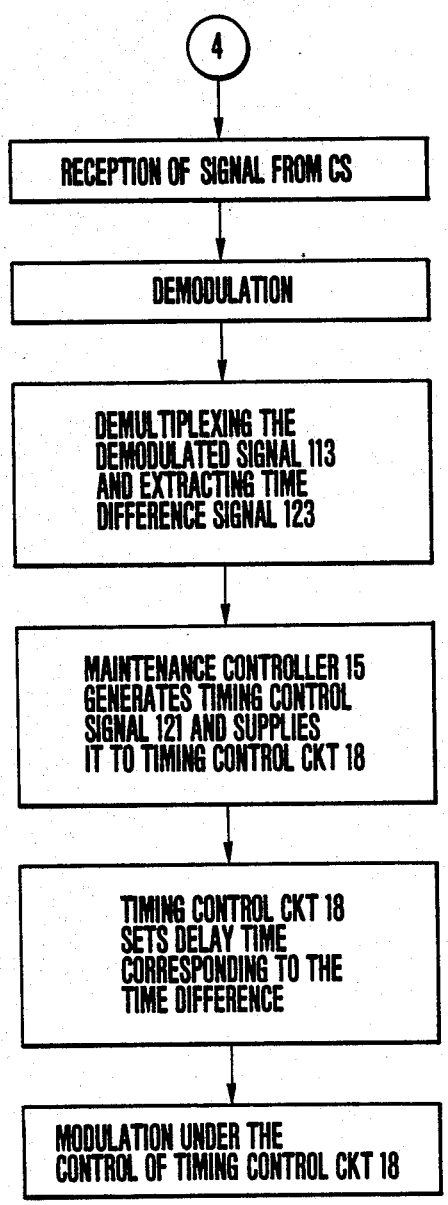

The communications between the central station CS shown in FIG. 2 and the subscriber station $SS_1$ shown in FIG. 3 are effected in the following manner, especially where there is no communication request for the subscriber station. FIGS. 4-7 are protocol flow charts useful to readily understand the following descriptions. FIG. 4 to 7 show the sequences proceeded in the order of figure numbers, FIGS. 4 and 6 show the operations of the central station and FIGS. 5 and 7 those of the subscriber station $SS_1$. Taking the subscriber station $SS_1$ as the typical one, the operations will be described as follows.

As information signal 101 applied to the central station CS from the terminal equipment TC is inputted to the transmission signal processor 1 where it is processed by the reference timing signal 104 supplied from the reference timing signal generator 4 and including the reference clock signal and the reference frame information signal for producing the main signal 102 containing a predetermined digital multiplexing signal and the reference clock signal, the main signal 102 being sent to the multiplexer 2. In a subscriber station not requested to transmit, a predetermined poling signal 109 is supplied to the multiplexer 2 from the maintenance controller 6. The main signal 102 and the maintenance poling signal 109 are multiplexed according to the reference timing signal 104 for producing a modulated signal 103 which is transmitted to the subscriber station $SS_1$ via the modulator 3 and the transmitter of the transmitting-receiving unit 7. One example of the frame construction of the modulated signal 103 is shown in FIG. 8a. FIG. 8a shows one example of the construction of one TDMA frame in which a synchronizing pattern F is added to the top of the frame. The pattern F, a maintenance channel M-CH, information channels CH-1, CH-2 ... CH-N are arranged in a time series. One example of the frame construction in a time slot corresponding to the maintenance channel M-CH is shown in FIG. 8b. In the maintenance channel frame shown in FIG. 8, an address code 201, an instruction code 202, and an information code 203 of the subscriber station $SS_1$ are arranged in a time series. Between the channels, guard times are arranged. The frame construction of the maintenance poling signal outputted from the maintenance controller 6 and multiplexed by the multiplexer 2 together with the main signal 102 is the same as the frame construction in a time slot of the maintenance channel M-CH shown in FIG. 8b.

FIG. 3 shows the principal elements of the subscriber station SS$_1$ not requested for transmission. A signal sent from the transmitter of the transmitting receiving unit 7 of the central unit is received by the receiver of the transmitting and receiving unit 10 of the subscriber station SS$_1$ shown in FIG. 3 and demodulated by demodulator 11 and the demodulated signal 113 is supplied to the demultiplexer 12 and the frame information regenerator 14 in which the frame synchronizing signal 114 is reproduced from the demodulated signal 113 and the reproduced synchronizing signal 114 is sent to the demultiplexer 12, received signal processor 13 and the transmission signal processor 16. In the demultiplexer 12, a maintenance poling signal 116 corresponding to the time slot of the maintenance channel is separated and extracted and the extracted signal 116 is sent to the maintenance controller 15. Of course, where an information signal for the subscriber station SS$_1$ presents, a main signal 115 inserted in a predetermined time slot is sent to the receiving unit RS-1 via the received signal processor 13 to act as an information signal 117 of a predetermined format.

The maintenance poling signal 116 outputted from the demultiplexer 12 is supplied to the maintenance controller 15 to form a maintenance burst signal 120 in accordance with the reference timing signal of the central station CS, and the burst signal 120 thus formed is sent to the multiplexer 17. In the multiplexer 17, the maintenance burst signal 120 and the frame costituting signal 119 is multiplexed. As illustrated in FIG. 9b, the frame of the maintenance burst signal 120 is constituted by the address code 204 of the subscriber station SS$_1$, an instruction response code 205 and an information code 206 which are arranged in a time series. The multiplexed signal 122 outputted from the multiplexer 17 is supplied to the modulator 19 via timing controller 18. The modulator 19 is also supplied with the burst control signal 124 from the transmission signal processor 16. In the modulator 19, the signal to be modulated is ON-OFF controlled with a predetermined timing to form the burst signal which is transmitted to the central station CS via the transmission-receiving unit 10. Of course, when the information signal 118 from the transmission terminal unit TS-1 is present, it is inputted to the transmission signal processor 16, and the processed information signal is inserted into a predetermined time slot of the frame constituting signal 119 to form an information burst signal which is sent to the central station from the transmission-receiving unit 10.

In the central station shown in FIG. 2, the burst signal containing the maintenance burst signal is applied to the demodulator 8 via transmission-receiving unit 7. The time series signal waveform of the burst signal is diagrammatically shown by FIG. 9a. As shown by this figure, the burst signal inputted to the demodulator 8 has a construction corresponding to that of the TDMA frame shown in FIG. 8a. More particularly, the maintenance burst signal sent from a subscriber station SS$_1$ not requested transmission is inserted in a time slot corresponding to the maintenance channel M-CH shown in FIG. 9a and the information burst signals sent from respective subscriber stations are inserted in the time slots corresponding to respective channels CH-1, CH-2 ... CH-N.

The demodulator 8 demodulates the burst signal sent from the transmitting-receiving unit 7 to produce a demodulated signal 111 corresponding to the main signal, the demodulated signal being sent to the received signal processor 9. The demodulator 8 also forms a reproduced clock signal 107 which is applied to the time difference detector 5, which is also supplied with the reference clock signal generated by the reference timing signal generator 4, where by the time difference between the reference clock signal 106 and the reproduced clock signal 107 is detected. During the normal operating state of the multidirection multiplex communication system, the time difference described above corresponds to the delay time caused by the propagation time corresponding to the central station CS and the subscriber station SS$_1$. Presence of the time difference means that the transmission timing of the subscriber station not requested to transmit is not in the optimum sampling position commensurate with the reference timing of the central station CS.

The time difference signal 108 detected by the time difference detector 5 is sent to the maintenance controller 6 to act as a time difference signal 110. In the same manner as the maintenance poling signal 109, the time difference signal 110 outputted from the maintenance controller 6 is multiplexed by the main signal 102 in the multiplexer 2 by the reference timing signal so as to form the modulated signal 103 which is sent to the subscriber station SS$_1$ via the modulator 3 and the transmitting receiving unit 7. The demodulated signal 111 outputted from the demodulator 8 is sent to the received signal demodulator 9 to be processed in accordance with the reference timing signal 105 sent from the reference timing signal generator 4. The output of the received signal processor 9 is sent to the terminal equipment RC as a signal from the subscriber station SS$_1$.

In the same manner as the above described case for receiving and demodulating the maintenance poling signal, in the subscriber station not requested transmission, the demultiplexer 12 separates and extracts the time difference signal 123 corresponding to the time slot of the maintenaecne channel and send to the maintenance controller 15. The maintenance controller 15 forms a predetermined timing control signal 121 corresponding to the value 01 the time difference signal 123 and supplies the signal 121 to the timing controller 18 which is constituted by a variable delay circuit, for example, for controlling the amount of delay time in relation to a digital or analogue quantity corresponding to the time difference. Consequently, under the control of the timing control signal 121, the delay time of the timing control circuit 18 would be set such that the time difference between the reference clock signal and the regenerated clock signal, which is detected in the central station. The delay time set in the timing controller 18 is maintained until it is renewed by the next maintenance poling signal.

In the same manner as the preassign system, also in the demand assign system, transmission timing control can be made for the subscriber station not requested transmission through a predetermined maintenance channel in the TDMA frame sent to the salve station from the central station. Moreover, it is possible to supervise and control the subscriber station not requested transmission. As a consequence, according to the multidirection multiplex system of this invention, from the standpoint of improving the transmission efficiency between the central station and the subscriber station, the advantages of both the preassign system and the demand assign system can be realized.

What is claimed is:

1. A multidirection multiplex communication system of a demand assign type including a central station and a plurality of subscriber stations cooperating therewith, in which only when one of said subscriber stations is requesting permission to transmit an information signal is a predetermined transmission time slot assigned to said subscriber station, wherein said central station comprises:

means for generating a maintenance poling signal for requesting a subscriber station which is not then requesting permission to transmit said information signal to send a predetermined maintenance burst signal from the subscriber station in response to the maintenance poling signal;

means for multiplexing said maintenance poling signal into a main signal constituted by a predetermined frame and for transmitting said main signal;

means for extracting a transmission timing signal from said predetermined maintenance burst signal which is sent in response to the maintenance poling signal to said central station from said subscriber station which is not then requesting permission for transmission of the information signal;

means comparing said transmission timing signal with a reference timing signal in said central station for detecting a timing deviation from an optimum sampling point of said predetermined maintenance burst signal transmitted from said subscriber station, to provide a time difference output signal;

means for multiplexing said time difference signal into a main signal which is constituted by a predetermined frame to send said main signal to said subscriber station;

and wherein each subscriber station comprises:

means responsive to said maintenance poling signal sent from said central station for generating a maintenance burst signal under control of a predetermined transmission timing signal and for sending back said maintenance burst signal to said central station;

means for extracting the time difference signal and said reference timing signal in said central station from said main signal sent from said central station; and means responsive to said time difference signal for controlling a phase of said timing signal in said subscriber station to maintain said transmission timing signal in said subscriber station in a synchronous state commensurate with said reference timing signal in said central station.

2. The system according to claim 1 wherein said frame comprises a time division multiple access (TDMA) frame.

3. The system according to claim 1 wherein said maintenance poling signal sent to said subscriber station not requesting to transmit said information signal is constituted by an address code, an instruction code and an information code.

4. The system according to claim 1 wherein said maintenance burst signal from said subscriber station not requesting to transmit said information signal is constituted by an address code, an instruction response code and an information code.

5. The system according to claim 1 wherein said means in said subscriber station for holding said transmission timing signal in a synchronous state commensurate with said reference timing signal in said central station includes timing control means that gives a delay time corresponding to said time difference signal to said transmission timing signal.

* * * * *